United States Patent [19]

Taniguchi

[11] Patent Number: 5,039,024
[45] Date of Patent: Aug. 13, 1991

[54] METHOD OF FIXEDLY MOUNTING TAPE ON CORE PORTION OF REEL MADE OF PLASTICS

[75] Inventor: Kotaro Taniguchi, Nagaokakyo, Japan

[73] Assignee: Polyplastics Co., Ltd., Osaka, Japan

[21] Appl. No.: 74,404

[22] Filed: Jul. 16, 1987

[30] Foreign Application Priority Data

Jul. 25, 1986 [JP] Japan .................. 61-175258

[51] Int. Cl.$^5$ ............... B65H 75/28; B32B 31/24
[52] U.S. Cl. .................. 242/74; 156/184; 156/185; 156/73.1; 156/73.2
[58] Field of Search ............... 242/74; 156/184, 185, 156/187, 73.1, 73.2, 73.3

[56] References Cited

U.S. PATENT DOCUMENTS 3,485,690 12/1969 Kozai ........................... 156/73.1
4,153,493 5/1979 den Hollander ................ 156/188
4,511,099 4/1985 Nunokawa et al. ............. 242/74 X Primary Examiner—Stuart S. Levy
Assistant Examiner—Steven M. DuBois
Attorney, Agent, or Firm—Burns, Doane, Swecker & Mathis

[57] ABSTRACT

A recording tape can be secured on a winding core of a tape reel, the core being made of a plastic material, by melting and fixing the end of the tape on the core, said tape being made of the substantially same plastic material as the core.

5 Claims, 2 Drawing Sheets

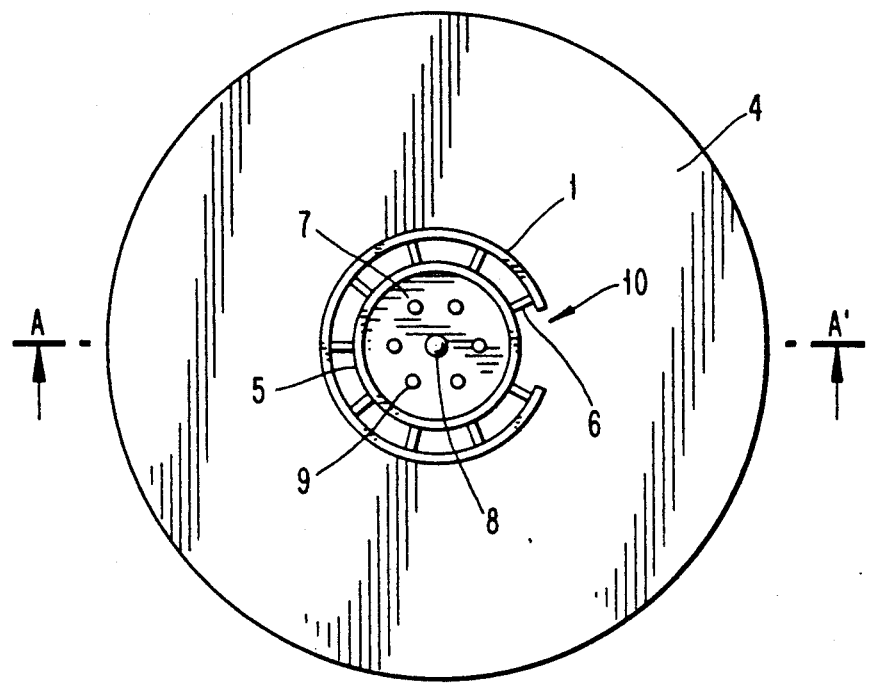
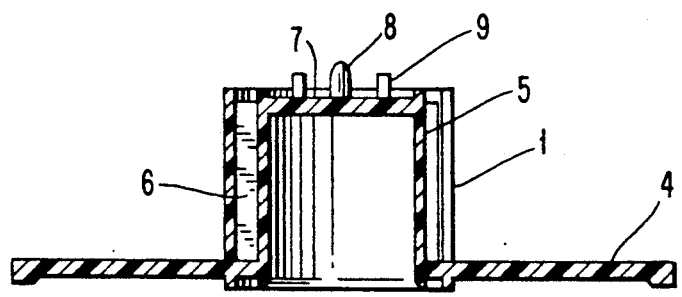
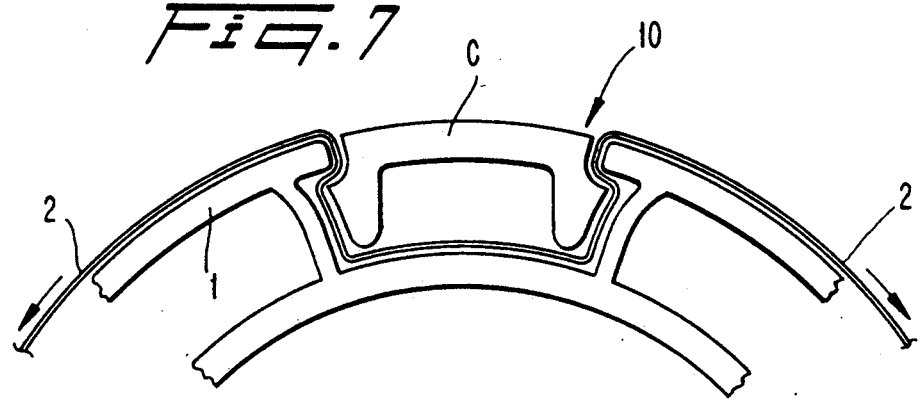

METHOD OF FIXEDLY MOUNTING TAPE ON CORE PORTION OF REEL MADE OF PLASTICS

The present invention relates to a method of fixedly mounting a tape made of plastics used in a tape recorder, a VTR-cassette and the like on a reel of a core portion of a tape made of plastics.

BRIEF DESCRIPTION OF THE DRAWINGS

FIG. 5 is a plan view showing one example of parts of the conventional tape reel;

FIG. 6 is a sectional view of FIG. 5 taken along the line A—A' thereof; and

FIG. 7 is a plan view showing the conventional method of fixedly mounting a tape on reel.

Figure 1:
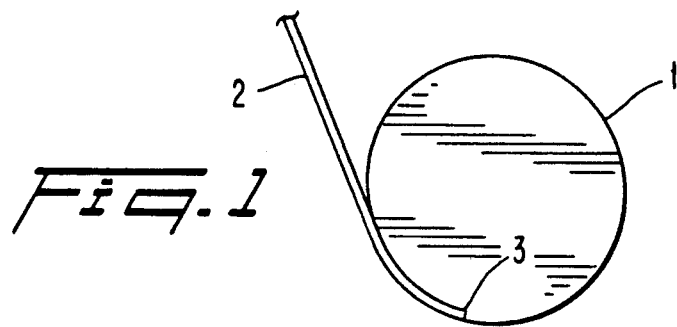
FIG. 1 is a schematic drawing describing a method of fixedly mounting a tape on a core of a reel.

1 ... Core portion
2 ... Tape
3 ... Dented portion
R, R' ... Reel

The recent spread of tape recorders and video tape recorders with a remarkable progress of electronic industry is wonderful. It is remarkably important to manufacture such parts in high accuracy and efficiently with the above described.

One example of a tape reel has the following construction. That is to say, the tape reel, as shown in Table 5, which is a plan view showing the tape reel, and FIG. 6, which is a sectional view of FIG. 5 taken along the line A—A' thereof, comprises a circular side plate 4, a cylinder 5 positioned at a center of said circular side plate 4 and a tape core 1 surrounding an outside circumference of said cylinder 5 through a rib 6, a crown plate 7 of said cylinder 5 being provided with a projection 8 as a center of rotation thereof and a plurality of caulking bosses 9 surrounding said projection 8 on an upper surface thereof. The other one side plate (provided with hole portions in which the bosses are to be put) (not shown) is spliced to such the tape reel and the bosses are caulked to form the tape reel.

According to the conventional method of fixedly mounting a tape, as shown in FIG. 7, a tape 2 is held down onto a reel made of plastics provided with a segmental portion 10 in a core portion 1 of the reel by means of a clamp C made of plastics and a leader tape used with being connected to an original magnetic tape is fixedly mounted between the clamp and the reel.

However, according to such a method, since it is required to form the segmental portion, in which the clamp is to be put, in a body of the tape core, a disadvantage occurs in that it is difficult to obtain a sufficient accuracy for a cylindricity and a perpendicularity of the reel and the reel as a whole. In addition, since the segmental portion is provided, a disadvantage occurs also in that a mold is expensive.

Besides, since problems have occurred in that the clamp for fixedly holding the tape therebetween is difficult to arrange in line with the body of the tape core, a loss of time being increased during the fixing process, the tape being broken if the tape is too strongly fixed and the like, it has been required for the portions to be arranged in line with each other to have a remarkably high accuracy.

In view of the above described problems, the present inventors found from their hard investigations of a method of fixedly mounting a leader tape used with being connected to an original magnetic tape that if a quite novel method, in which a tape made of plastics of the same system as a reel core portion is used as the tape and said tape is deposited on said reel core portion, is adopted, it is not required to provide a segmental portion in the core portion as in the conventional method, whereby the disadvantages incidental to the conventional method can be solved by one effort. Thus the present invention was achieved.

That is to say, a method of fixedly mounting a tape on a core portion of a reel made of plastics according to the present invention is characterized by that the tape made of materials of the same system as the reel core portion is deposited on the core portion.

The invention provides a method for securing a recording tape on a winding core of a tape reel, the core being made of a plastic material, by melting and fixing the end of the tape on the core, said tape being made of the substantially same plastic material as the core.

It is preferable that the core has a recess on the winding surface to receive the end of the tape and the melting is conducted by heating or applying to the ultrasonic waves.

The reel made of plastics according to the present invention is a reel provided with a core portion, around which a tape is wound, said reel being not specially limited, and reels, which have been preferably used in a VTR-cassette, a tape recorder, a computer and the like, may be used. The plastics used in the present invention are not specially limited. Engineering plastics, such as polyacetal resins, thermoplastic polyester resins, for example polybutylene terephthalate resins, and polyamide resins, of homo- or copolymer type are preferably used.

The known additives may be added according to the desired physical properties. For example, 1) In order to give an antistatic property, an antistatic agent is added to control an impediment in operation due to an electrification (an adherence of a tape to a core), an adherence of dusts, an electrostatic impediment and the like.

2) Additives and resins, which can be deposited on the tape, can be added or copolymerized according to materials of the core. For example, as for the core made of ABS resins, depositable substances can be mixed or copolymerized with the resins for the tape.

The tape to be deposited on the core portion is made of materials of the same system as the core portion. For example, in the event that the core portion is made of polyacetal resins, the tape made of polyacetal resins is selected. In addition, in the event that the core portion is made of polybutylene terephthalate resins, the tape made of polyester resins is selected.

Usually portions other than the core portion, for example side plate portions, are made of materials of the same system as the core portion of tape reel but also different materials may be used.

The tape to be deposited is usually a leader tape attached to a magnetic tape for protecting and winding up the magnetic tape but in the event that the leader tape is not used, the magnetic tape itself may be deposited.

Besides, a thickness of the tape is not specially limited. It is 1 to 5 μm, preferably 7 to 35 μm, similarly to that of the tape which has been usually used.

The tape may have a mono-layer structure or a multi-layer structure in which a film formed of other materials for reinforcing in mechanical property is laminated on a surface opposite to a surface on which a film made of materials of the same system as the core portion is deposited.

In addition, the leader tape having the desired transmissivity may be used.

Also the depositing means is not specially limited but the thermal deposition or the supersonic deposition is preferably used in view of adhesive capacity.

A concrete method of depositing the tape on the reel is below described.

According to the present invention, as shown in FIG. 1, a tape 2 can be fixedly mounted on a true circular core portion 1 having no segmental portion by directly depositing the tape 2, in particular a pointed end portion thereof, on the core portion 1. In this case, the depositing surface of the core portion may be subjected to a process for increasing a deposition efficiency. Concretely speaking, the depositing surface is preferably subjected to a dappling process or a process for forming a large number of remarkably small ribs.

Besides, in order to make the thickness of the tape uniform all around one turn thereof, a remarkably slight dented portion 3 for depositing the tape as shown in FIG. 1 may be formed in the depositing surface of the core so as to surround the core portion with a constant curvature.

Also the core portion may be provided with a slit for putting an end portion of the tape therebetween to deposit a bent portion of the tape.

A depositing method is similar to a depositing method of usual plastics but in the case of the ultrasonic deposition, if a horn is formed so as to correspond to the curvature of the core, the deposition is properly carried out which is desirable.

An adhesive tape, which has been used, can be used for connecting the other one end of the deposited tape to the magnetic tape.

According to the prevent invention, since the tape can be fixedly deposited directly on the reel without using a clamp, the method can be remarkably simplified.

In addition, since it is not required to form a segmental portion in a core portion of a tape, advantages, such as an improvement of a tape reel in accuracy as a whole and a reduction of a manufacturing cost of a metal mold, can be achieved. Accordingly, the method according to the present invention is remarkably practical in comparison with the conventional method.

The present invention is described with reference to the preferred embodiments but it is not limited to them.

PREFERRED EMBODIMENT 1

Figure 2:
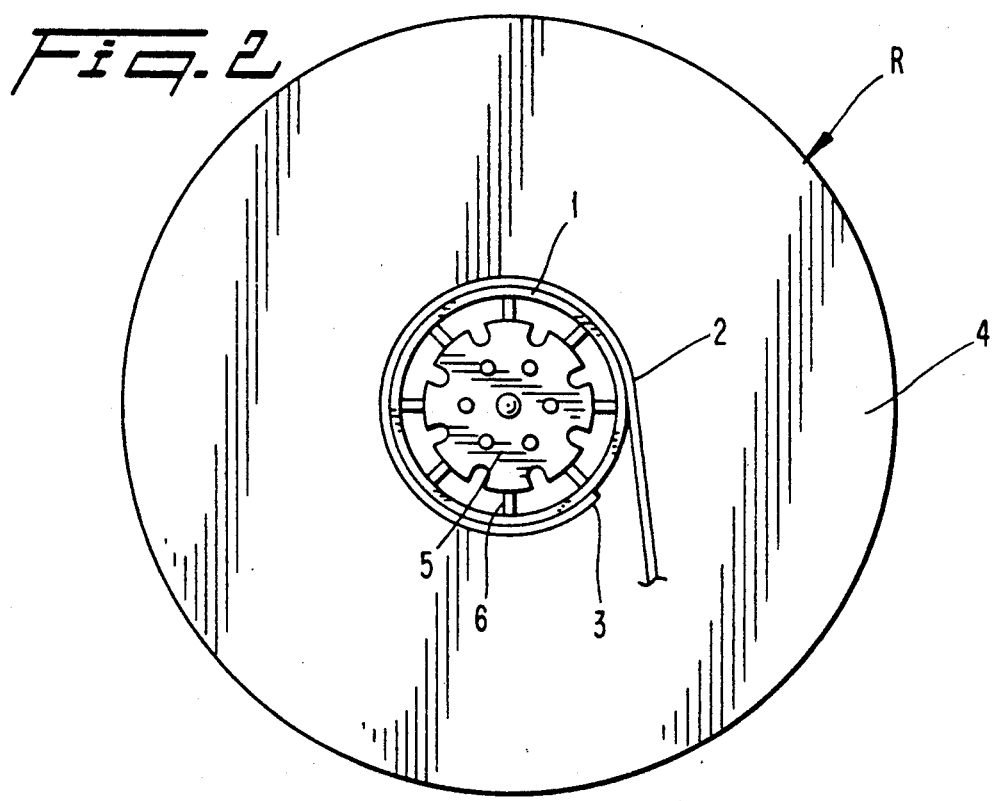
FIG. 2 is a plan view showing a state of depositing a tape on a VTR tape reel using a method according to the present invention.

FIG. 2 shows a VTR tape reel R formed of polyacetal resin of copolymer type (DURACON manufactured by Polyplastics Co., Ltd.) with the tape 2 made of the same resin deposited thereon by ultrasonic waves.

Figure 3:
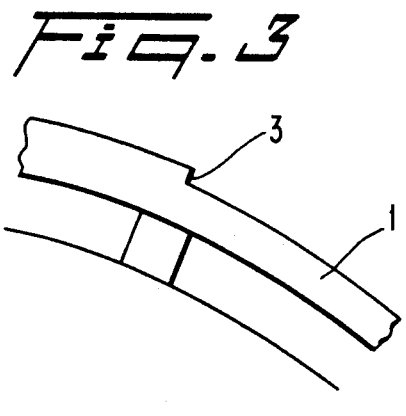
FIG. 3 is a detailed drawing showing a deposited portion of the tape.

The detailed deposited portion of the tape is shown in FIG. 3. The depositing portion is provided with the dented portion 3 formed so as to have a depth corresponding to a thickness to the tape.

PREFERRED EMBODIMENT 2

Figure 4:
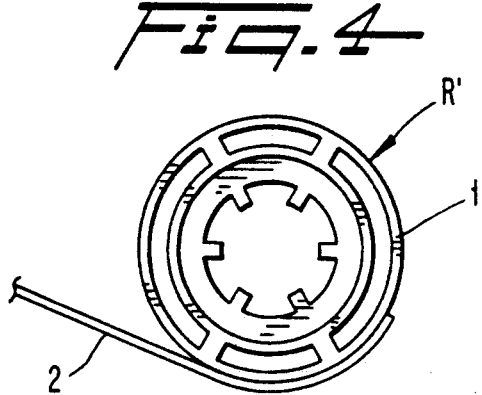
FIG. 4 is a plan view showing a state of depositing a tape on a tape reel of a tape recorder using a method according to the present invention.

FIG. 4 shows a tape reel R' of a tape recorder formed of polyacetal resin used in the preferred embodiment 1 with the tape 2 made of the same resin deposited thereon.

What is claimed is:

1. A method for securing a recording tape on a winding core of a tape reel, the core being made of a plastic material, which comprises melting and fixing the end of the tape on the core, said tape being made of the substantially same plastic material as the core.

2. The method of claim 1, further comprising the step of providing said tape and said core, both made of a polyacetal.

3. The method of claim 1, further comprising the step of providing said tape and said core, both made of a thermoplastic polyester.

4. The method of claim 1, further comprising the step of providing a recess in said core to receive said end of said tape.

5. The method of claim 1, wherein said melting step is accomplished by heating or by the application of ultrasonic waves.

* * * * *